United States Patent [19]

Akiwumi-Assani

[11] Patent Number: 5,008,848
[45] Date of Patent: Apr. 16, 1991

[54] CIRCUIT FOR PERFORMING S-TRANSFORM

[75] Inventor: Samuel O. Akiwumi-Assani, Beacon, N.Y.

[73] Assignee: North American Philips Corporation, New York, N.Y.

[21] Appl. No.: 358,982

[22] Filed: May 30, 1989

[51] Int. Cl.[5] .......................................... G06F 15/332
[52] U.S. Cl. .................... 364/725; 358/448; 364/727
[58] Field of Search .............. 364/725, 727; 382/43; 358/448

[56] References Cited

U.S. PATENT DOCUMENTS

| | | | |
|---|---|---|---|
| 4,134,134 | 1/1979 | Lux | 358/280 |
| 4,190,861 | 2/1980 | Lux | 358/135 |
| 4,621,337 | 11/1986 | Cates et al. | 382/43 |
| 4,675,836 | 6/1987 | Arnould | 364/725 |
| 4,831,440 | 5/1989 | Borgers | 358/133 |
| 4,897,881 | 1/1990 | Ledinh et al. | 382/43 |

FOREIGN PATENT DOCUMENTS 0245903 11/1987 European Pat. Off. .

OTHER PUBLICATIONS

Carl et al., "A Hybrid Walsh Transform Computer", *IEEE Trans. on Computers*, vol. C-22, No. 7, Jul. 1973, pp. 669–672.

Fukinuki et al., "Intraframe Image Coding by Cascaded Hadamard Transforms", *IEEE Trans. on Communications*, vol. COM-21, No. 3, Mar. 1973, pp. 175–180.

Primary Examiner—David H. Malzahn
Attorney, Agent, or Firm—Anne E. Barschall

[57] ABSTRACT

An improved circuit for performing the S-transform and inverse S-transform on digital images. Data is fed back so that only one stage of adder/subtracters is required. The circuit elements have little idle time, making for efficient VLSI implementation.

10 Claims, 14 Drawing Sheets

CIRCUIT FOR PERFORMING S-TRANSFORM

BACKGROUND OF THE INVENTION

1. Field of the Invention

The invention relates to circuits for performing the S-transform, particularly VLSI implementations of such circuits.

2. Related Art

The S-transform is an image coding technique which is bit preserving, i.e. lossless. The transform is well suited for hierarchical image decomposition as well as image data compression. Hierarchical image decomposition is well suited for networks benefiting from progressive image transmission.

The S-transform has been described, inter alia, in Th. Wendler et al., "Proposed standard for variable format picture processing and a codec approach to match diverse imaging devices", SPIE vol. 318 (Part 1) Picture Archiving & Communications Systems (PACS) for Medical Applications (1982) pp.298-305.

An implementation of the S-transform in the context of coding images is given in U.S. Pat No. 4,134,134 (issued to Lux on Jan. 9, 1979).

Transforms applied to digital data are generally implemented using a conventional "butterfly" technique. In a butterfly technique, data is passed forward through a system, and processed in such a manner that the signal flow graphs for some data elements cross each other somewhat like a butterfly. A description of a butterfly technique, as applied to the FFT is given, for instance, in L. R. Rabiner et al., *Theory and Application of Digital Signal Processing*, (Prentice-Hall 1975) pp 361-363.

A disadvantage of the traditional techniques is that the circuit elements, such as adders and subtracters, are not used efficiently. Specifically, some of the elements are left idle while other elements are performing pieces of the transformation. The presence of idle circuit elements makes for expensive implementation in VLSI.

SUMMARY OF THE INVENTION

It is an object of the invention to reduce the number of circuit elements, and particularly the number of idle circuit elements, necessary to perform the S-transform.

It is a further object of the invention to perform the inverse S-transform with the same circuit elements as are used to perform the S-transform.

The objects of the invention are achieved in that feedback, multiplexing, and bit routing are used so that circuit elements are used in more than one stage of calculation.

DETAILED DESCRIPTION OF THE PREFERRED EMBODIMENT

1. S-transform theory

Figure 1:
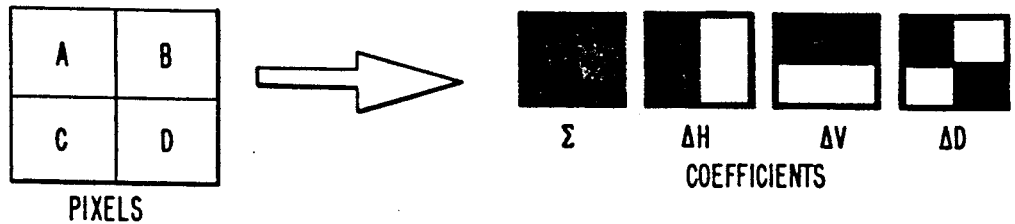
FIG. 1 shows schematically how a block of four pixels are transformed into coefficients using the S-transform.

FIG. 1 shows schematically how a block of four pixels is transformed into the S-transform coefficients by four orthogonal two dimension basis functions. In calculating the S-transform coefficients, the reference letters are related as follows:

$$\Sigma = (a+b+c+d)/4 \qquad (1)$$

$$\Delta H = ((a+c)-(b+d))/2 \qquad (2)$$

$$\Delta V = ((a+b)-(c+d))/2 \qquad (3)$$

$$\Delta D = ((a+d)-(b+c)) \qquad (4)$$

Where $\Sigma$, $\Delta H$, $\Delta V$, $\Delta D$ are coefficients called the Sum, Horizontal difference, Vertical difference, and Diagonal difference, respectively; and where "a" and "b" are adjacent pixels on one raster line, and "c" and "d" are the corresponding pixels on the next raster line of the image to be processed.

The inverse transform is computed as follows:

$$a = ((2*rs1 + lsb[rs2]) + rs2)/2 \qquad (5)$$

$$b = ((2*rs1 + lsb[rs2]) - rs2)/2 \qquad (6)$$

$$c = ((2*rd1 + lsb[rd2]) + rd2)/2 \qquad (7)$$

$$d = ((2*rd1 + lsb[rd2]) - rd2)/2 \qquad (8)$$

where $$rs1 = ((2*\Sigma + lsb[\Delta V]) + \Delta V)/2 \qquad (9)$$

$$rd1 = ((2*\Sigma + lsb[\Delta V]) - \Delta V)/2 \qquad (10)$$

$$rs2 = ((2*\Delta H + lsb[\Delta D]) + \Delta D)/2 \qquad (11)$$

$$rd2 = ((2*\Delta H + lsb[\Delta D]) - \Delta D)/2 \qquad (12)$$

and lsb [$_{13}$] is a function which takes the least significant bit of its argument.

The above transformations are advantageous, because they require only simple arithmetic operations i.e. only adders and subtracters.

After one step of forward transformation of the image, the resulting Sum coefficient array is an averaged intensity version of the previous image with half the spatial resolution in both x- and y- dimensions. This Sum image can now be further decomposed as before. Similarly, for inverse transformation, successively higher spatial resolution images can be reconstructed by combining the Sum image with the difference coefficients for that level.

2. A circuit for performing the S-transform

Figure 7:
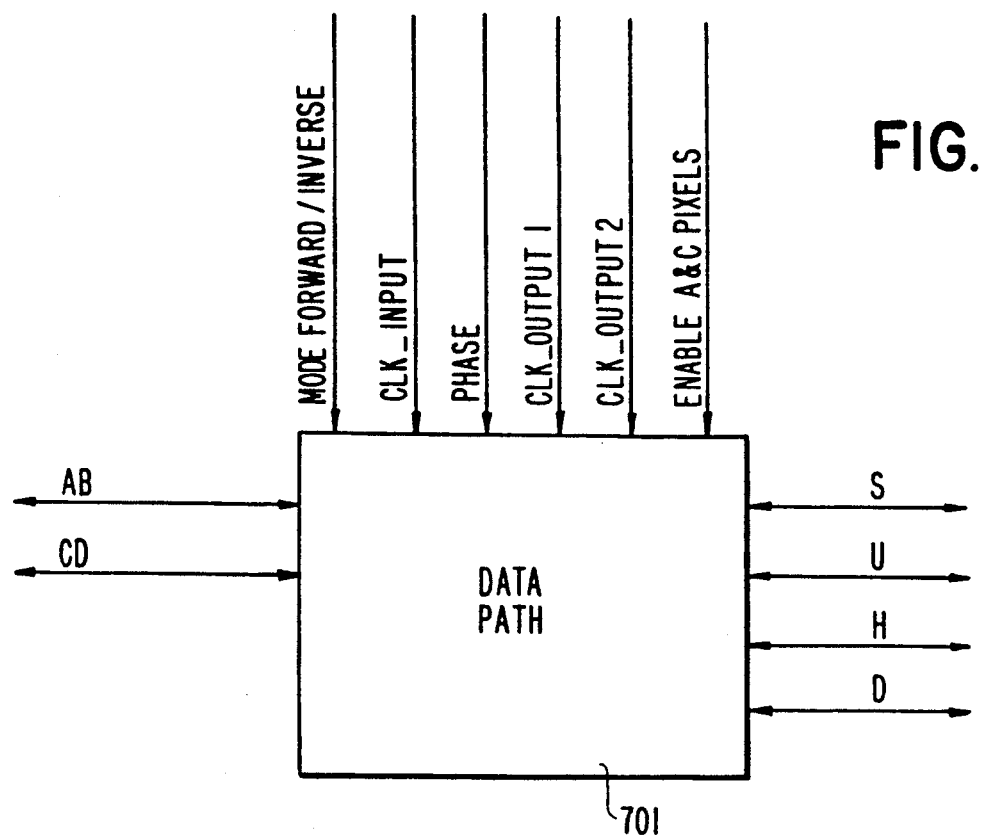
FIG. 7 is an overview block diagram of the circuit according to the invention.
Figure 7:
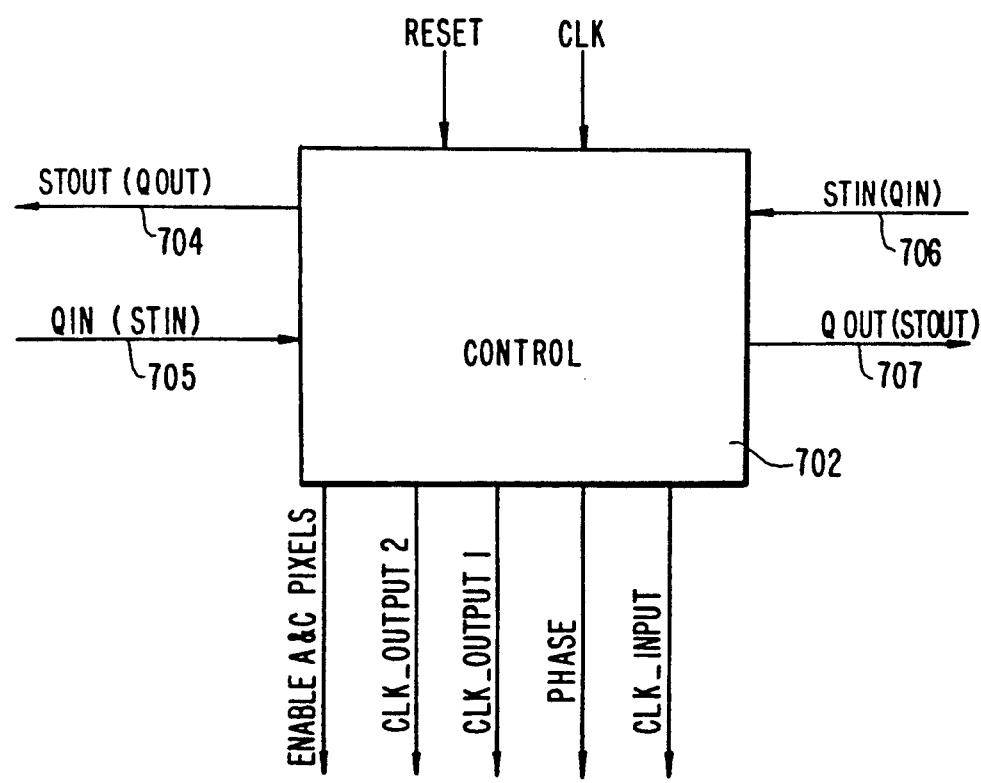

FIG. 7 is a general block diagram of the circuit according to the invention. The invention has a data path 701 and a control element 702.

The following is a description of the data inputs and outputs of the circuit:

Pixel port:

QIN[STIN]—a one bit control line input. In forward mode it is QIN and in inverse it is STIN. In forward mode it indicates when pixels are valid for transfer. In inverse mode it indicates when the external circuit can consume generated pixels.

STOUT[QOUT]—a one bit control line output. In forward mode it is STOUT. In inverse mode it is QOUT. In forward mode, it indicates when the device can accept pixels. In inverse mode, it indicates when valid pixels are to be accepted by the external circuit.

AB—a 13 bit bidirectional pixel data bus. In forward mode, AB is an input. In inverse mode, AB is an output. AB represents the raster line which contains pixels a and b.

CD—a 13 bit bidirectional pixel data bus. In forward mode, CD is an input. In inverse mode, CD is an output. CD represents pixels on the raster line which contains pixels c and d.

Coefficient Port:

QOUT[STOUT]—a one bit control line output. In forward mode it is QOUT. In inverse mode it is STOUT. In forward mode, it indicates when the device can supply coefficients. In inverse mode, it indicates when the device can accept coefficients from the external circuit.

QIN[STIN]—a one bit control line input. In forward mode it is STIN and in inverse it is QIN. In forward mode it indicates when the external circuit can accept coefficients. In inverse mode it indicates when the external circuit has valid coefficients to be consumed.

S—This line represents a 13 bit bidirectional sum coefficient bus. In forward mode, S is an output. In inverse mode, S is an input. S represents $\Sigma$ from Equation (1).

V—This line represents a 14 bit bidirectional vertical coefficient bus. In forward mode, V is an output. In inverse mode, V is an input. V represents $\Delta V$ from Equation (3).

H—This line represents a 14 bit bidirectional horizontal coefficient bus. In forward mode, H is an output. In inverse mode, H is an input. H represents $\Delta H$ from Equation (2).

D—This line represents a 15 bit bidirectional diagonal coefficient bus. In forward mode, D is an output. In inverse mode, D is an input. D represents $\Delta D$ from Equation (4).

The circuit also uses control signals: MODE FORWARD, CLK$_{13}$INPUT, CLK$_{13}$OUTPUT1, CLK$_{13}$OUTPUT2, PHASE and ENABLE A & C PIXELS. There is also a control signal MODE INVERSE which is the logical inverse of MODE FORWARD. MODE INVERSE and MODE FORWARD come from a chip interface. The other control signals are produced by the control element 702. Box 702 also has a reset input and an input CLK for receiving the system clock.

Figure 2:
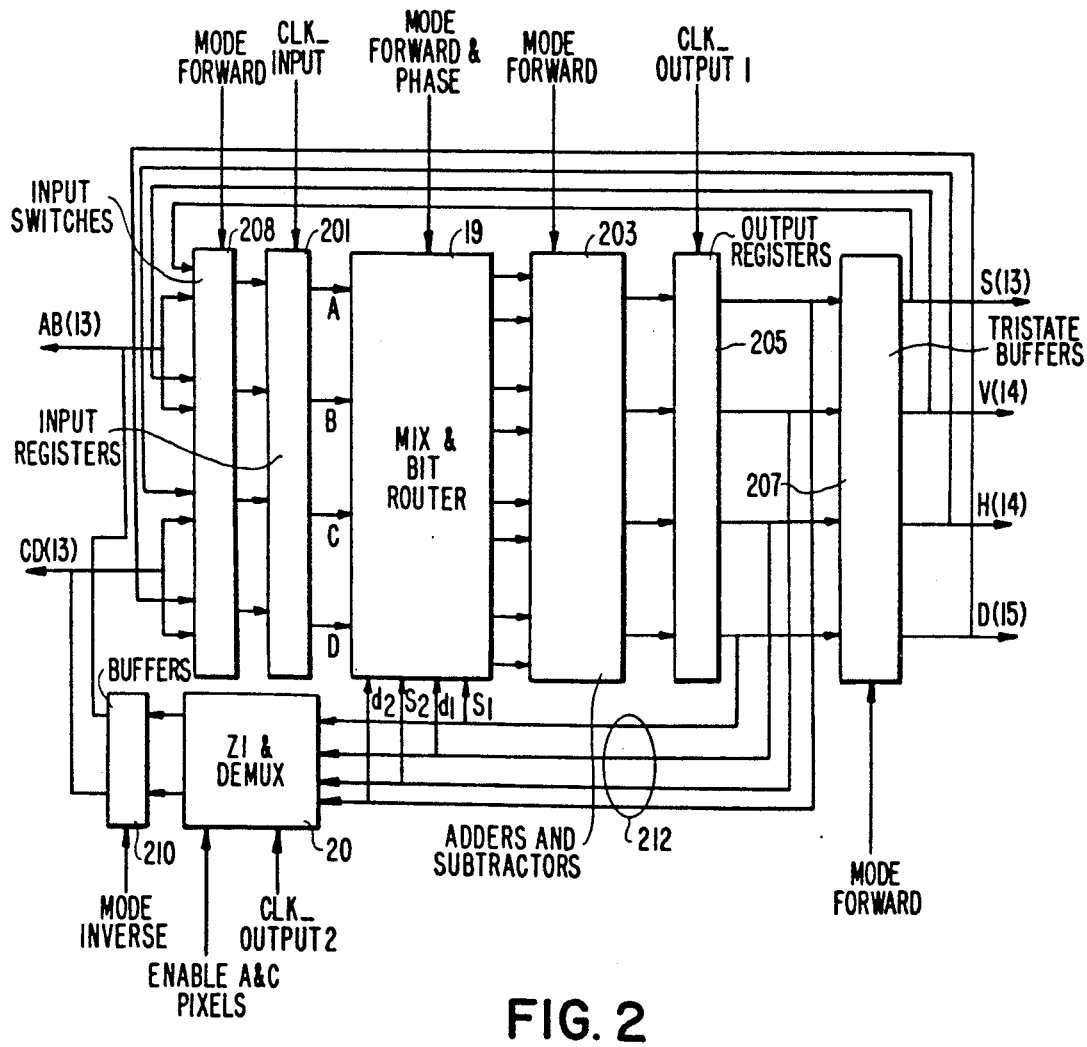
FIG. 2 is a block diagram of the data path of a circuit according to the invention.

FIG. 2 shows more details of the data path 701.

Figure 3:
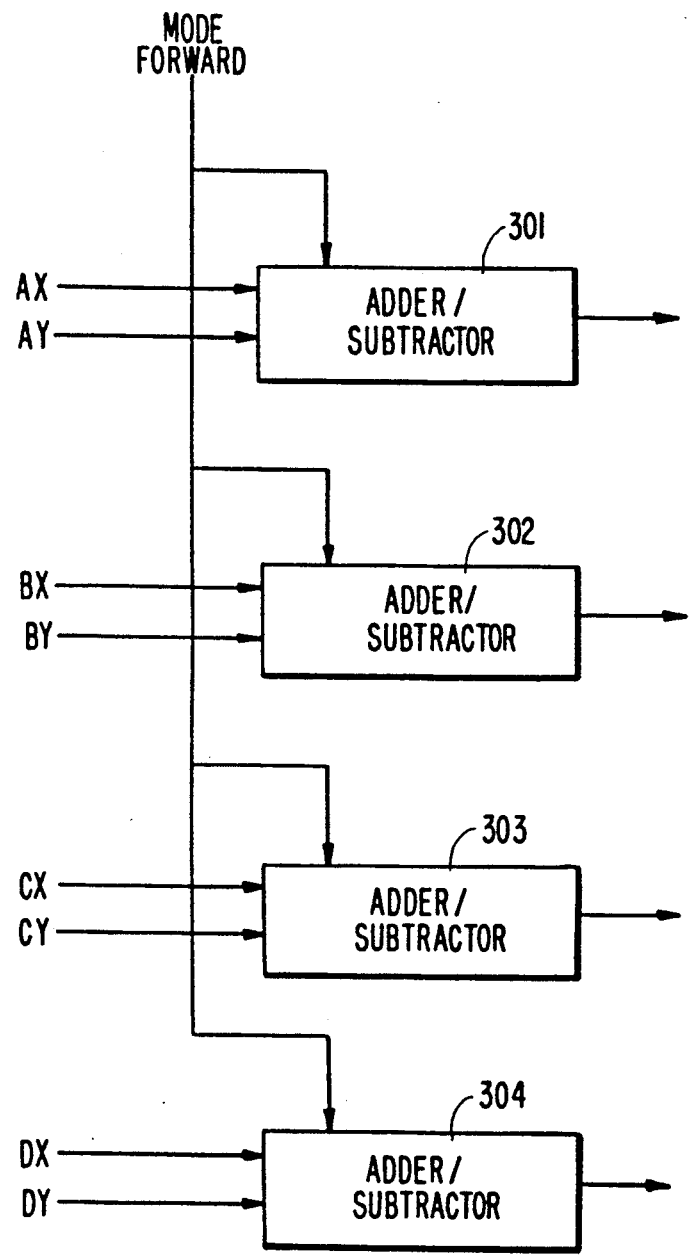
FIG. 3 is a block diagram of further details of box 203 of FIG. 2.

The circuit according to the invention requires only one stage of adder/subtracters 203. Box 203 includes four adder/subtracters 301, 302, 303, and 304 in parallel. As shown in FIG. 3 each of the adder/subtracters has a control input for receiving the signal MODE FORWARD/ MODE INVERSE and inputs for receiving signals representing numbers to be added.

The circuit of FIG. 2 relies on internal data feedback paths 212 that are routed through a dynamically configurable data multiplexer and bit router 19 to use the adder/subtracters repeatedly for various stages of calculation.

Figure 4:
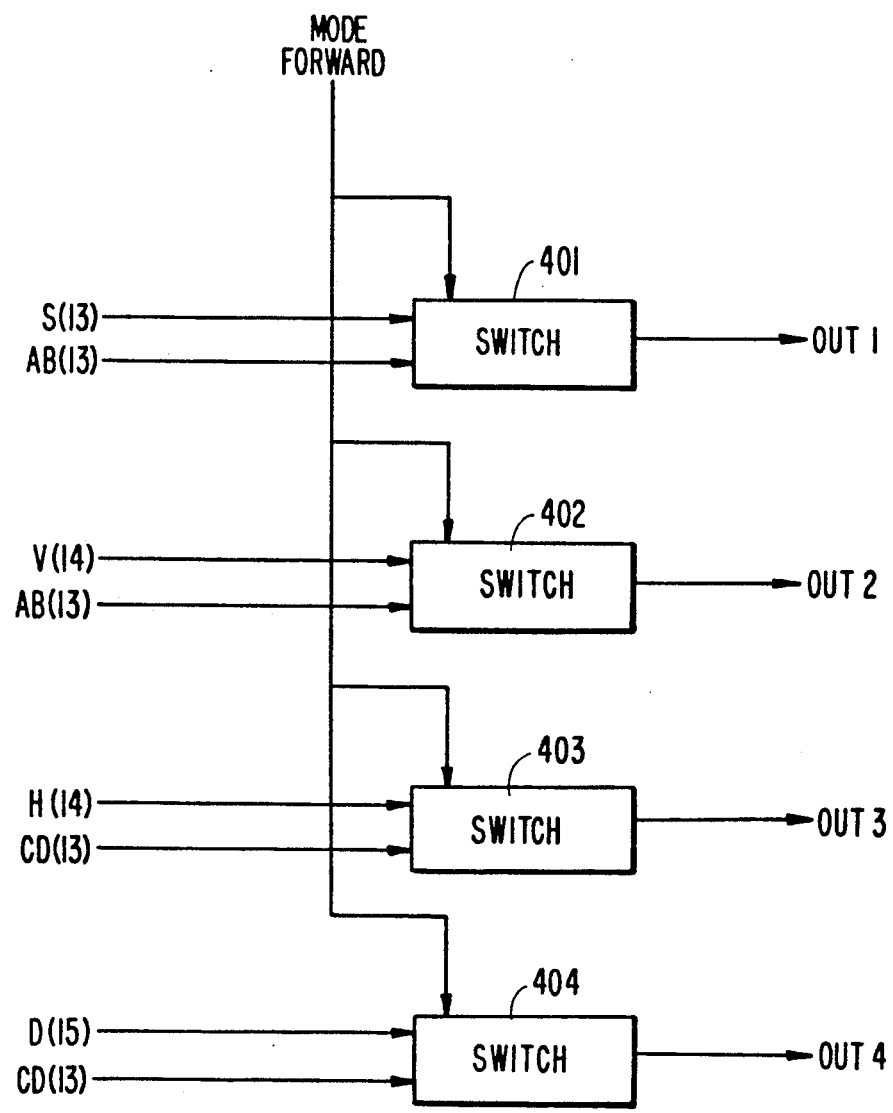
FIG. 4 is a block diagram of further details of box 208 of FIG. 2.

Other elements of the circuit are input registers 201, output registers 205, input switches 208, tri-state buffers 207, Z1 & Demux 20, and output tri-state buffers 210. Box 208 includes four switches in parallel, as shown in FIG. 4. Under control of the signal MODE FORWARD, each switch chooses between a bus from the pixel port and a bus from the coefficient port. Box 201 includes four input registers in parallel. Each of the registers has a respective data input coupled to a respective one of the switches of FIG. 3 and a respective control input coupled to receive the control signal CLK$_{13}$INPUT. Box 205 includes four output registers in parallel, each register having a control input for receiving the control signal CLK$_{13}$OUTPUT1 and a data input coupled with a respective one of the data outputs of the adder/subtracters 301, 302, 303, 304. Box 207 includes four tri-state buffers in parallel. Each respective tri-state buffer of box 207 has a data input coupled to a data output of a respective one of the output registers of box 205 and a respective control input coupled to receive the control signal MODE FORWARD. The tri-state buffers of box 207 each have a respective data output coupled with a respective one of the buses S, V, H, and D of the coefficient port. Box 210 includes two tri-state buffers in parallel. Each of the buffers of box 210 has a respective data input coupled with a respective one of the data outputs of box 20 and a respective data output coupled to a respective one of the buses AB and CD of the pixel port. The buffers of box 210 each have a respective control input coupled to receive the control signal MODE INVERSE.

Figure 12:
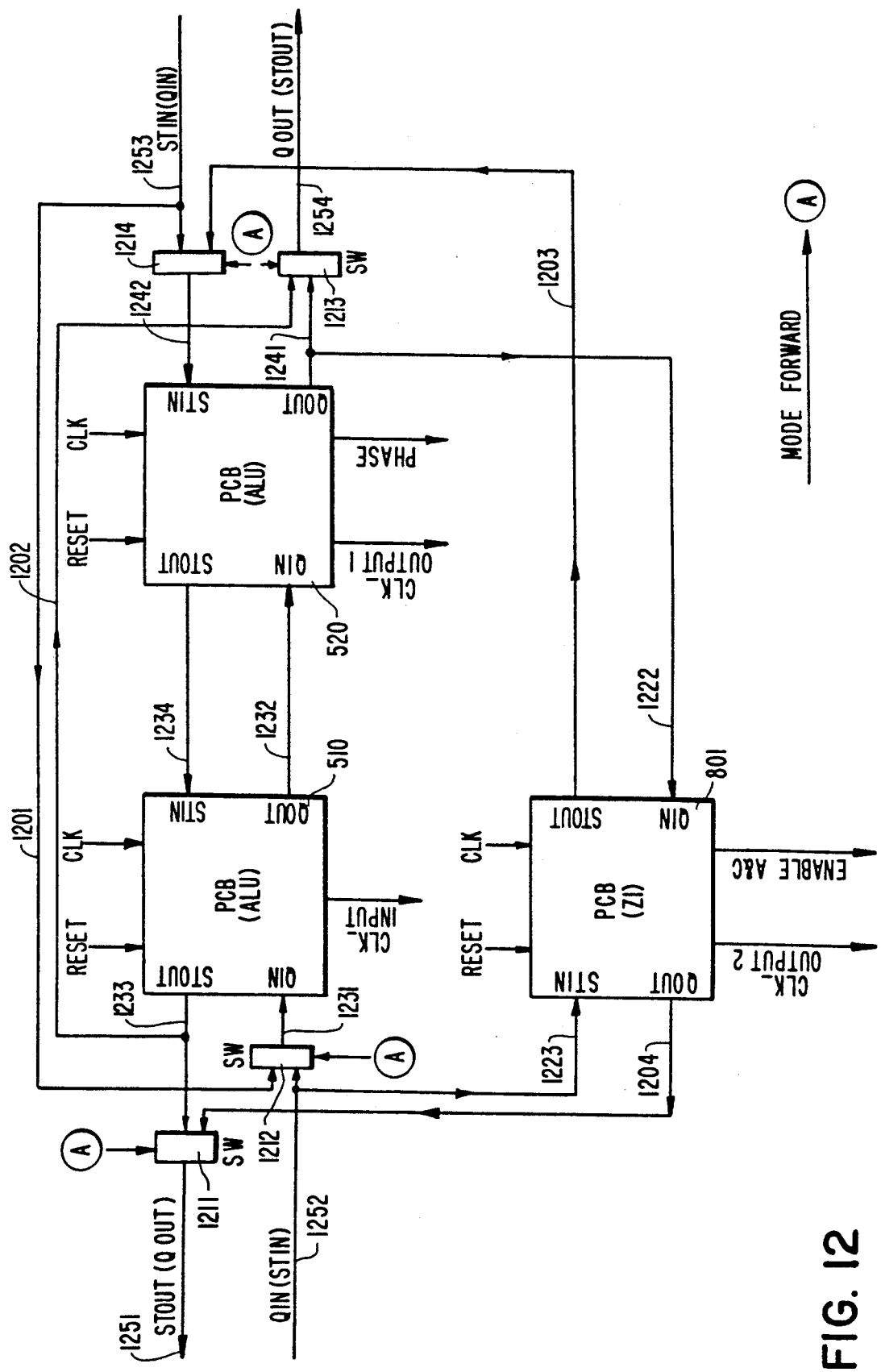
FIG. 12 is a block diagram showing contents of box 702 of FIG. 7.

FIG. 12 shows details of the control element 702. There are three state machines, PCB (IN) 510, PCB (ALU) 520, and PCB (Z1) 801. Each of the state machines has a reset input and an input for the system clock. Each of the state machines provides at least one of the control signals needed by the data path. The control element also includes four switches 1211, 1212, 1213, 1214 which choose between their inputs under control of the signal MODE FORWARD. Each of the state machines has inputs called STIN and QIN and outputs called STOUT and QOUT. In forward mode STOUT 1233 determines STOUT 1251; QIN 1252 determines QIN 1231; STIN 1253 determines STI 1242; and QOUT 1241 determines QOUT 1254. In inverse mode QOUT 1204 determines QOUT 1251; QIN 1253 determines QIN 1231; STOU 1233 determines STOUT 1254; and STIN 1252 determines STIN 1223. Thus the labels of the inputs and outputs of the pixel and coefficient ports of box 702 are changed depending on whether the circuit is in forward or inverse mode, according to the function of the connected input port of the PCB. The functions of the various numbered lines will be further explained below with reference to the state diagrams of FIGS. 14–16.

3. Operation

A. Forward Mode

The device receives a sequence of pixels and coefficients on the respective buses and feeds a linear pipeline. There is no data merging or branching. Line buffering for raster scans occurs externally.

Figure 5:
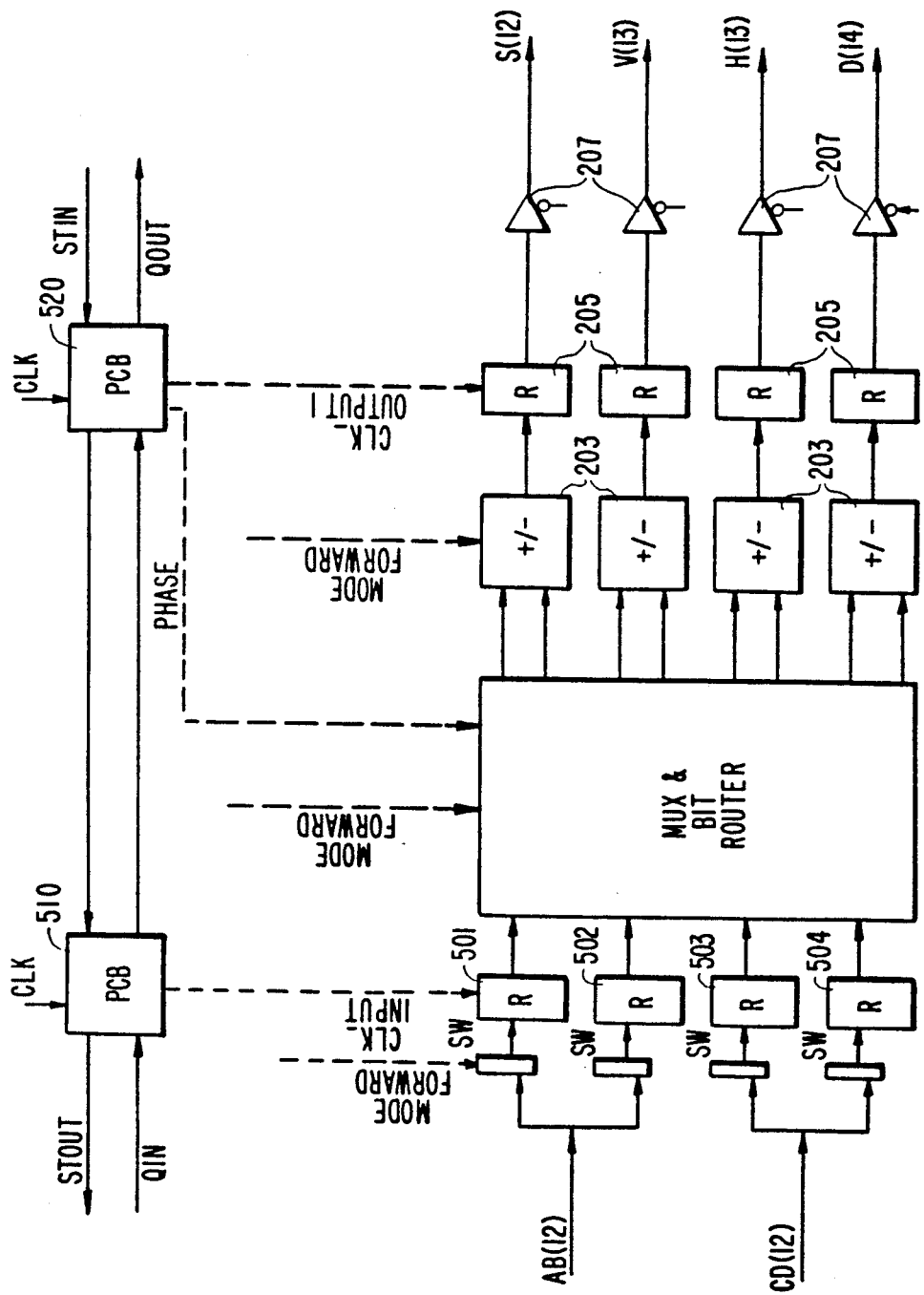
FIG. 5 is a functional diagram showing a first configurational phase of forward operation of the circuit of FIG. 2.

FIG. 5 shows the configuration of the circuit of FIG. 2 during a first configurational phase of forward operation. The output tri-state buffers 210 do not contain useful information, and therefore do not appear on the figure, while the output tri-state buffers 207 are enabled. Similarly the feedback lines 212 and box 20 do not contain useful information and are therefore not shown.

Pixels enter the two raster lines on buses AB and CD in two system clock cycles CLK. In the first system clock cycle CLK, pixels a and c enter. In the second system clock cycle CLK, pixels b and d enter.

The switches 208 are configured so that input pixels are routed to appropriate registers within block 201. In other words, pixel a is loaded into the register 501, if QIN 705 is true at the rising edge of the clock CLK, and if this register and the downstream register stages have the capacity to absorb more data. Simultaneously, pixel c is loaded into the register 503. The next time QIN 705 is true at the rising edge of the clock CLK and the conditions are met as before, pixels b and d are simultaneously loaded into registers 502 and 504 respectively.

While the four pixels are being loaded, the block labeled "MUX & bit Router" 19 is configured to route the contents of the input registers 501, 502, 503, 504 into the adder/subtracter array 203. During the first configurational phase, the adder/subtracters are configured to generate the appropriate operation with the proper precision. At the end of the first configurational phase, the partial results are latched into the output register set 205, which now hold the values, from top to bottom:

| | | |
|---|---|---|
| s1 = (a + b)/2 | range [0 to 4095] | |
| d1 = (a − b) | range [−4096 to 4095] | |
| s2 = (c + d)/2 | range [0 to 4095] | |
| d2 = (c − d) | range [−4096 to 4095] | |

FIG. 5 also shows PCB blocks 510 and 520. Switches 1211, 1212, 1213, 1214 have disabled lines 1204, 1201, 1202, and 1203, respectively, so that PCB block 801 is ignored.

Figure 6:
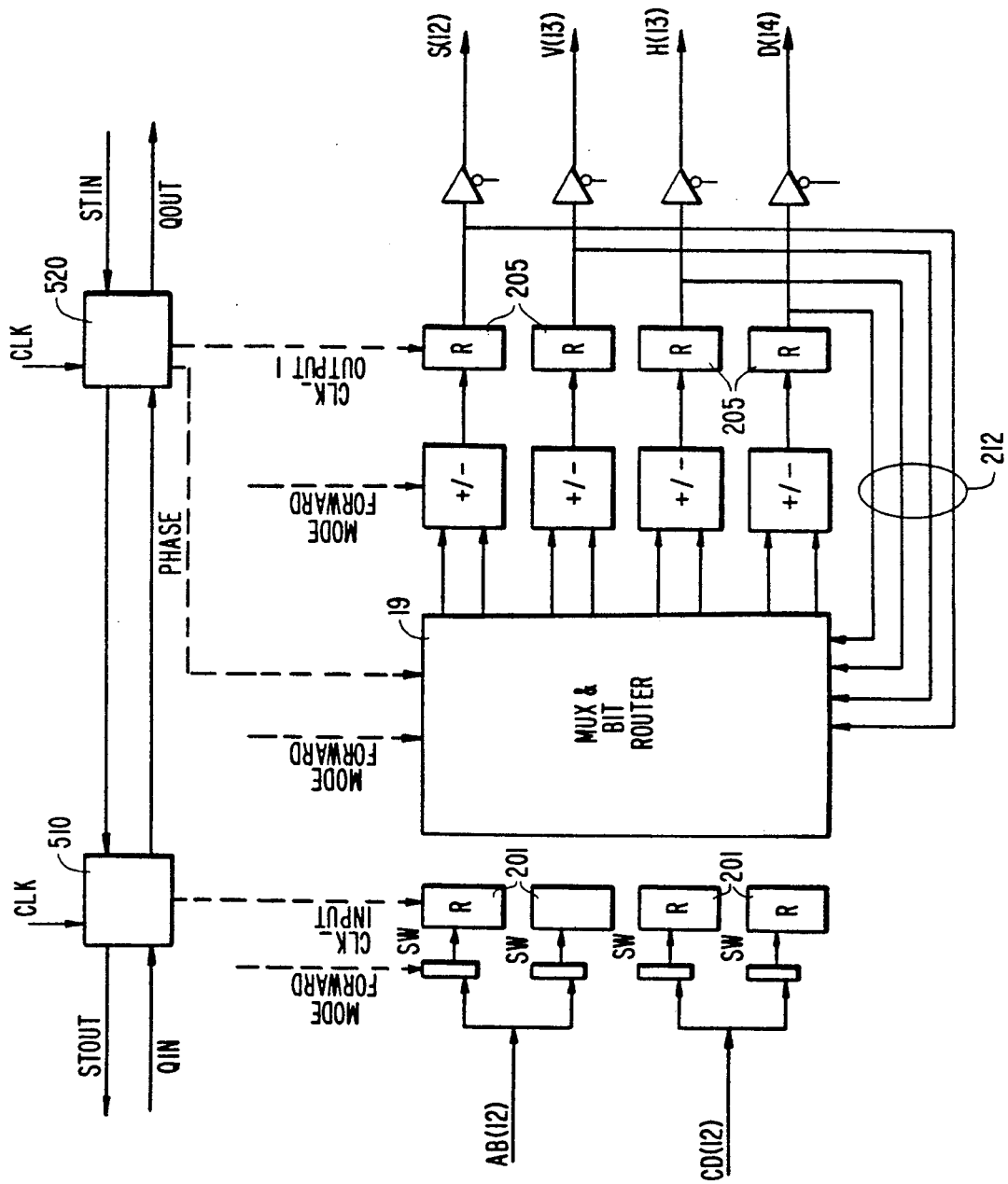
FIG. 6 is a functional diagram showing a second configurational phase of forward operation of the circuit of FIG. 2.

FIG. 6, shows the configuration of the device of FIG. 2 during a second configurational phase of forward operation. The MUX block 19 is configured to route s1, d1, s2, and d2 into the adder/subtracter array such that the proper operation and precision are effected. The outputs of the registers 201 do not contain relevant data and are now disconnected by the PHASE control signal to box 19 and are therefore not shown. The feedback lines now contain useful data and are caused to be routed to Box 19 by the PHASE control signal, and are therefore shown in this figure. In this second configurational phase, partial results from output registers 205 are fed back through box 19 and adder/subtracter array, which performs the following operations:

| | | |
|---|---|---|
| Σ = (s1 + s2)/2 | range [0 to 4095] | (13) |
| ΔH = (d1 + d2)/2 | range [−4096 to 4095] | (14) |
| ΔV = (s1 − s2) | range [−4096 to 4095] | (15) |
| ΔD = (d1 − d2) | range [−8192 to 8191] | (16) |

The final result is clocked into the output registers at the next rising edge of $CLK_{13}OUTPUT1$.

At the end of configurational phase two, the output registers 205 are loaded with the second configurational phase results which are the coefficients Σ, ΔH, ΔV, and ΔD.

B. Inverse Mode

Figure 8:
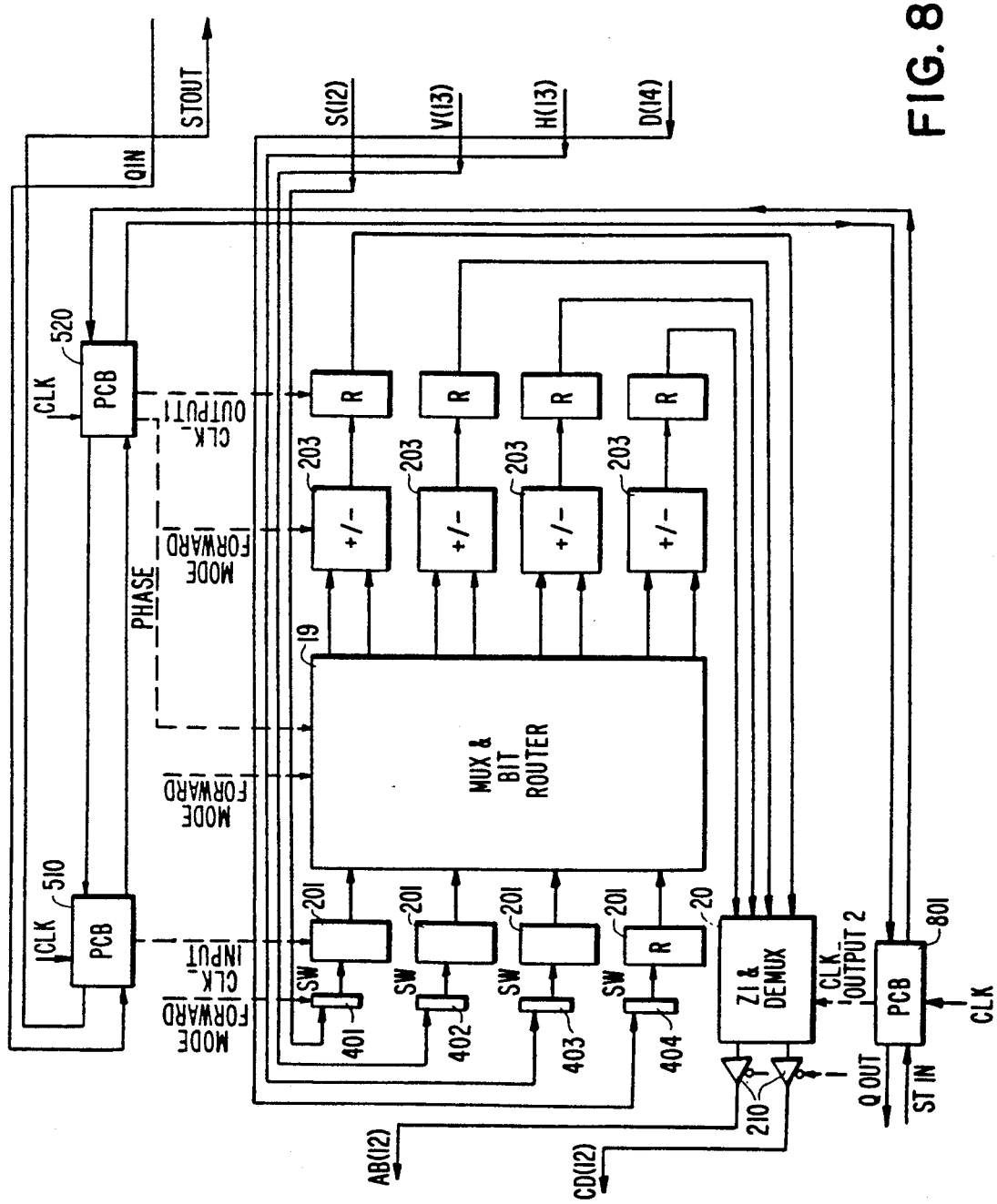
FIG. 8 is a functional diagram showing a first configurational phase of inverse operation of the circuit of FIG. 2.

FIG. 8 shows the configuration of the device of FIG. 2 during a first configurational phase of inverse operation. In inverse mode, the output tri-state buffers 210 are enabled, by the control signal INVERSE MODE. The output tri-state buffers 207 are disabled by the same signal, and are therefore not shown.

The switches 401, 402, 403, and 404 are controlled by the signal MODE FORWARD, now low, to choose as inputs, the coefficients Σ, ΔH, ΔV, and ΔD from the S, V, H, and D buses. From the switches 401, 402, 403, 404, the coefficients are loaded into the input registers 201 and subsequently processed by box 19 and the adder/subtracter array 203. The MUX 19 not only routes the input to the adder/subtracter array but takes care of routing the bits of some of the inputs so as to accomplish multiplication by 2 and LSB (least significant bit) restoration. At the end of this phase, the output registers 207 are loaded with the partial results from equations (9)–(12), i.e. rs1, rd1, rs2, and rd2, which have the following ranges, respectively: [−4069 to 4095], [−4069 to 4095], [−8192 to 8191], and [−8192 to 8191]. These partial results are provided to Z1 & Demux, box 20, but are marked as invalid by the QOUT signal from box 801 so that they are not read from the pixel port. Switches 1211, 1212, 1213, and 1214 have, under control of the low value of MODE FORWARD, chosen lines 1204, 1201, 1202, and 1203 respectively, altering the apparent configuration of the PCB blocks.

Figure 9:
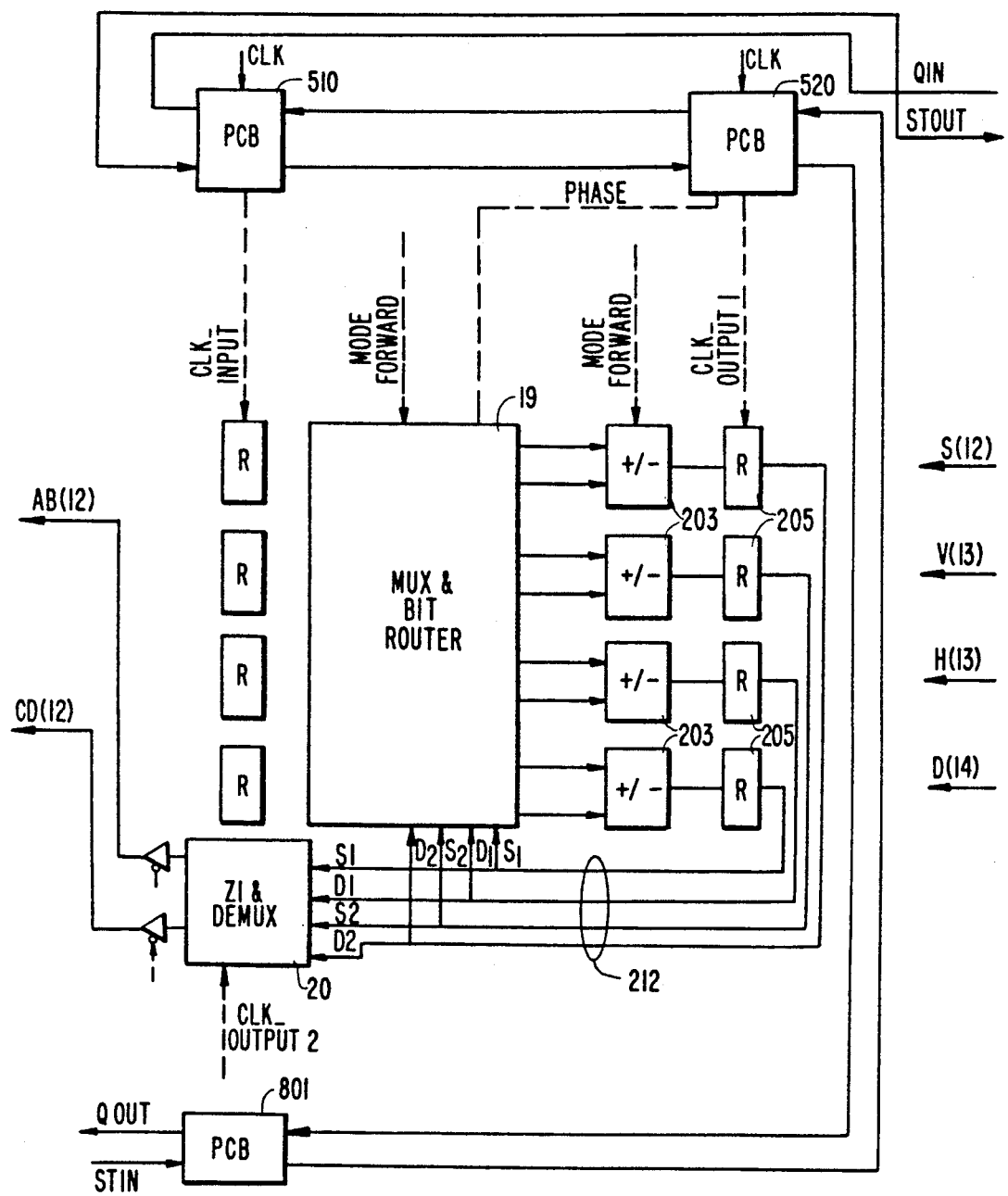
FIG. 9 is a functional diagram showing a second configurational phase of inverse operation of the circuit of FIG. 2.

FIG. 9 shows the configuration of the device of FIG. 2 in a second configurational phase of inverse operation. MUX 19 enables lines s1, d1, s2, and d2 to route the partial results rs1, rd1, rs2, rd2 over the feedback path 212 to the adder/subtracter array 203, which is appropriately configured. Prior to adder/subtracter array 203, MUX 19 effects multiplication by two and accounts for the least significant bit.

At the end of phase two, the output registers 205 are loaded with the reconstructed pixels according to the equations (5)–(8) above. During this second phase of operation the data appearing on the pixel port is still marked as invalid by QOUT on the pixel port.

Figure 10:
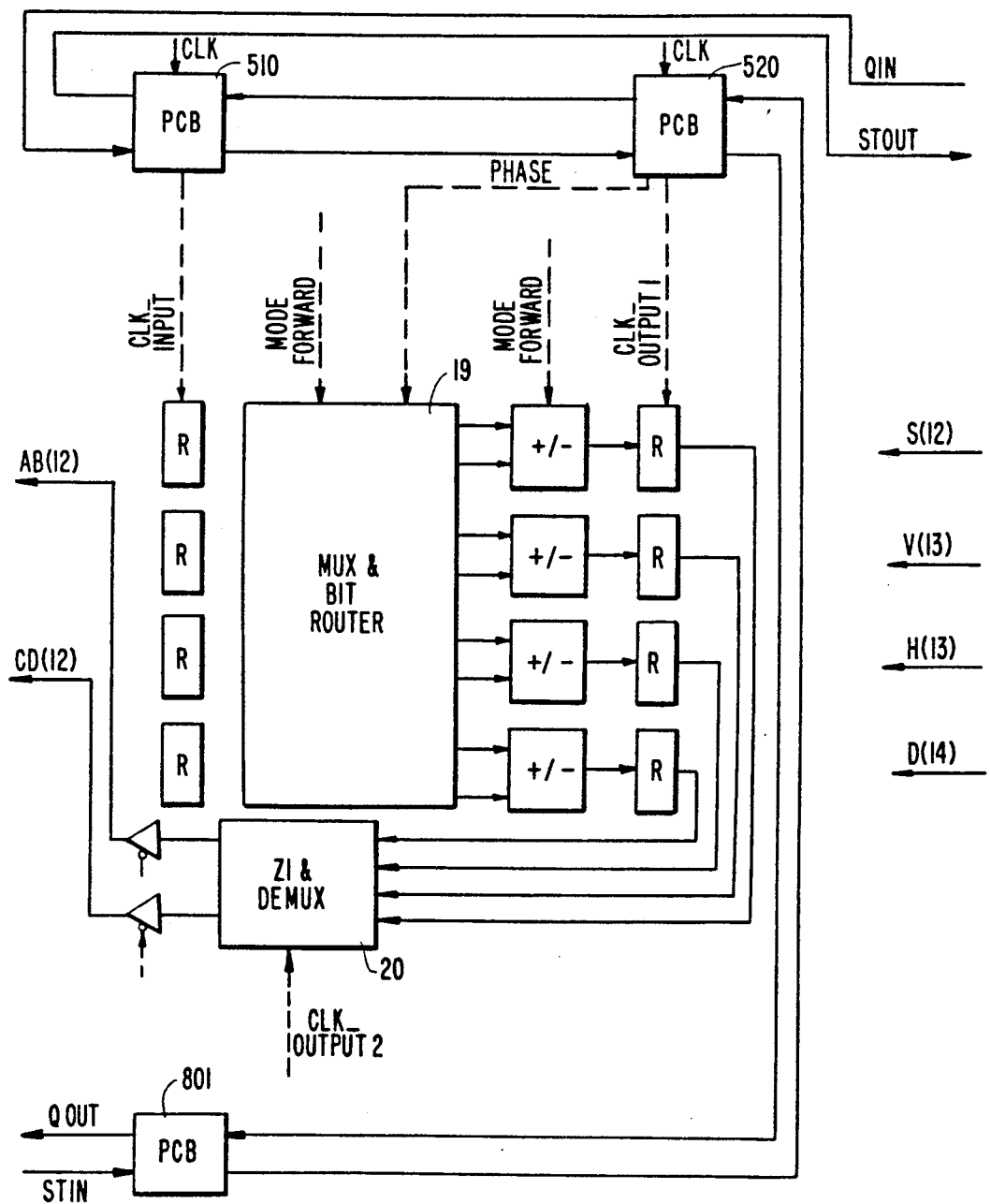
FIG. 10 is a functional diagram showing a third configurational phase of inverse operation of the circuit of FIG. 2.

FIG. 10 shows the configuration of the device of FIG. 2 in the third and final phase of inverse operation. In this third phase, the pixels are routed to the buses AB and CD via the block labeled Z1 & Demux 20. Block 20 demultiplexes the a and b pixels onto the AB bus and simultaneously the c and d pixels onto the CD bus. When the reconstructed pixels are valid the signal QOUT is true. Block 20 also ensures that reconstructed pixels having negative values are converted to zero level pixels.

Figure 11:
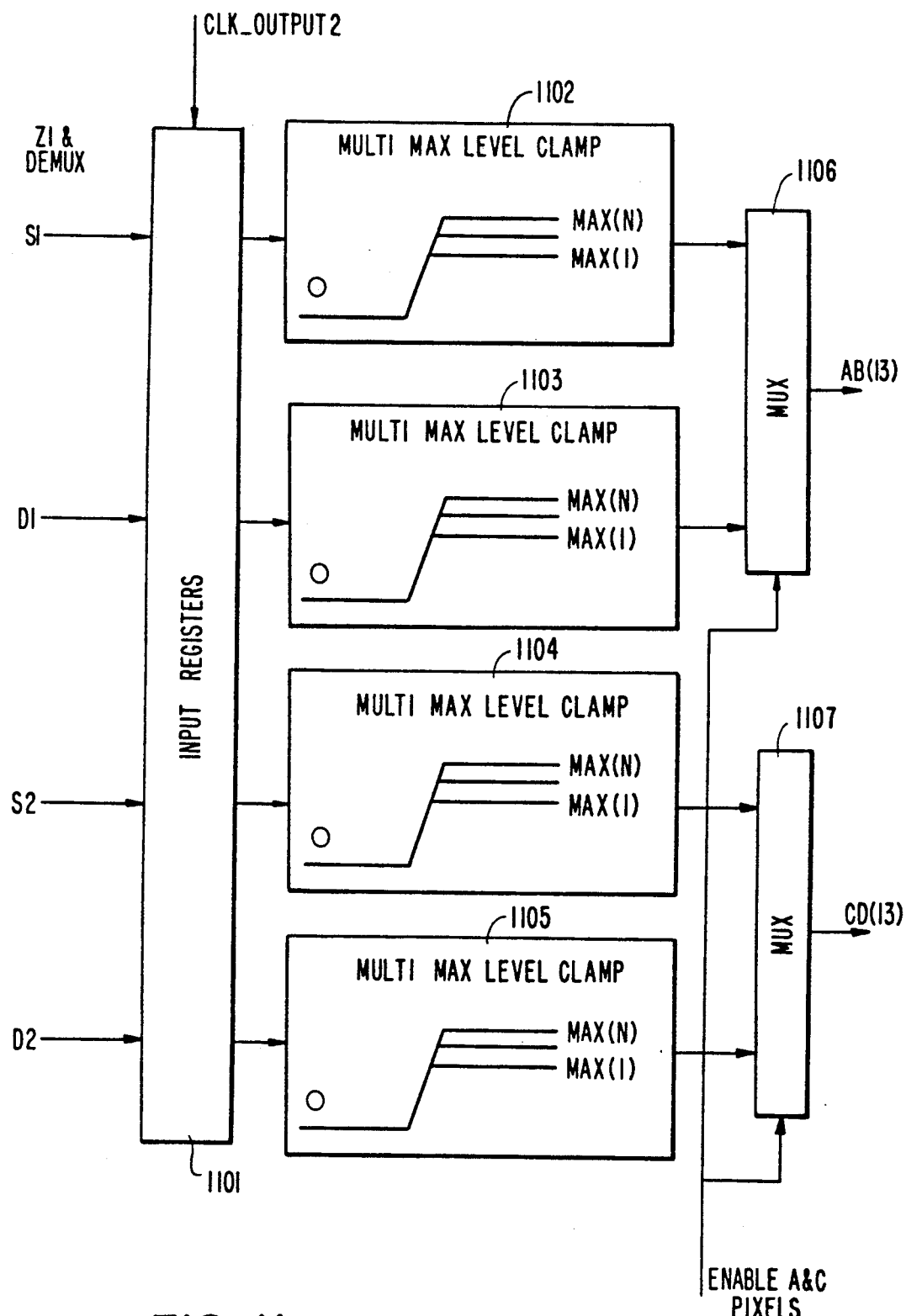
FIG. 11 is a block diagram showing the contents of box 20 of FIG. 2.

FIG. 11 shows further details of block 20. Block 20 includes four input registers in parallel 1101, clocked by the signal CLK_OUTPUT2, to store signals representing pixels on lines S1, D1, S2, and D2. Block 20 also includes four clamps 1102, 1103, 1104, and 1105. Pixels are multiplexed to the pixel port using the multiplexers 1106 and 1107.

Figure 13:
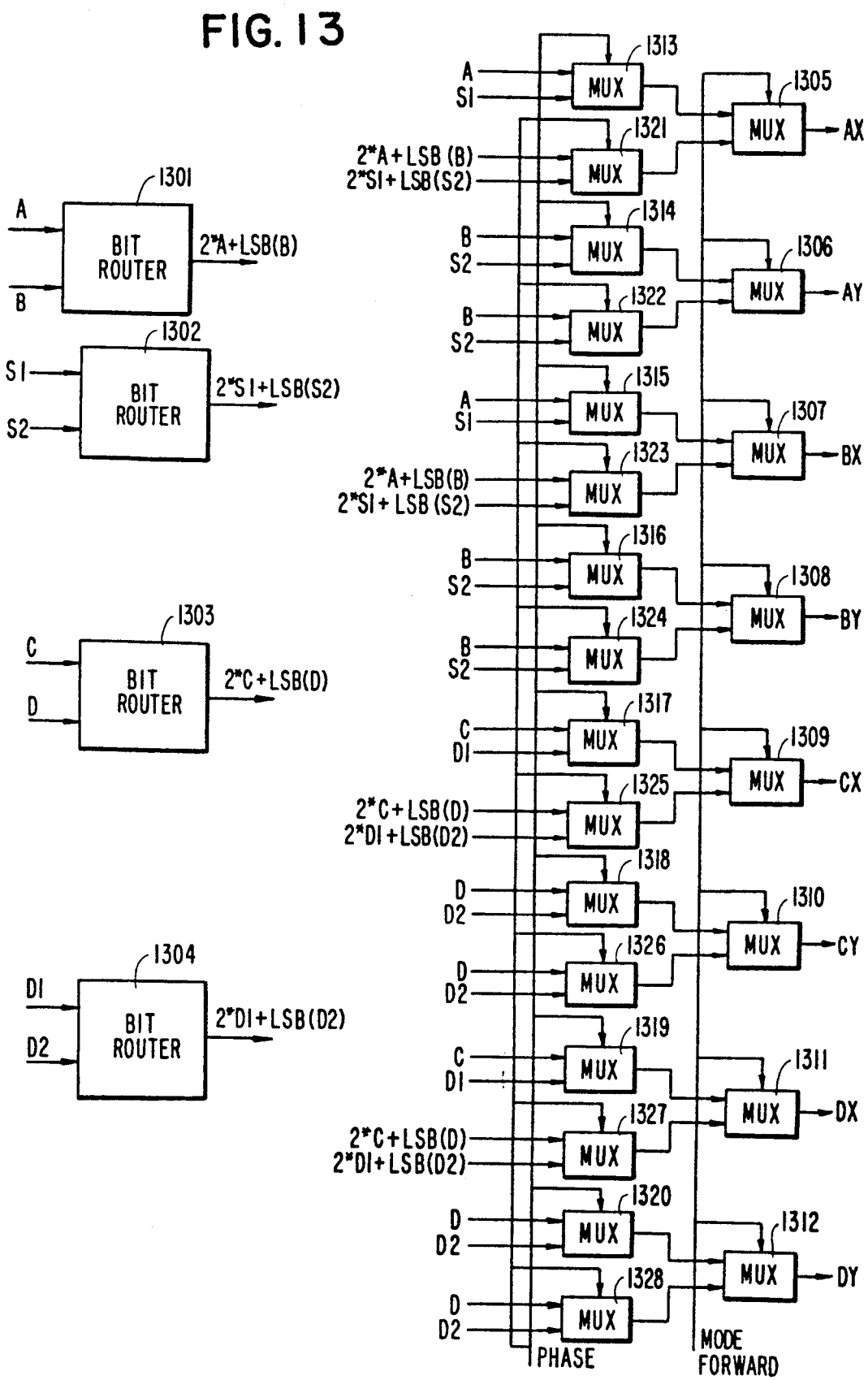
FIG. 13 is a block diagram of the contents of box 19 of FIG. 2.

FIG. 13 is a diagram of the interior of box 19. Box 19 has eight data outputs ax, ay, bx, by, cx, cy, dx, and dy. The outputs of Box 19 have the following values at the indicated values of the signal PHASE:

| Forward Mode, PHASE=1: | | | |
|---|---|---|---|
| ax=a; | bx=a; | cx=c; | dx=c; |
| ay=b; | by=b; | cy=d; | dy=d; |
| Forward Mode, PHASE=0: | | | |
| ax=s1; | bx=s1; | cx=d1; | dx=d1; |
| ay=s2; | by=s2; | cy=d2; | dy=d2 |
| Inverse Mode, PHASE=1: | | | |
| ax=2*Σ+lsb[ΔV]; | | bx=2*Σ+lsb[ΔV]; | |
| cx=2*ΔH+lsb[ΔD]; | | dx=2*ΔH+lsb[ΔD]; | |
| ay=ΔV; | by=ΔV; | cy=ΔD; | dy=ΔD; |
| Inverse Mode, PHASE=0: | | | |
| ax=2*rs1+lsb[rs2]; | | bx=2*rs1+lsb[rs2]; | |
| cx=2*rd1+lsb[rd2]; | | dx=2*rd1+lsb[rd2]; | |
| ay=rs2; | by=rs2; | cy=rd2; | dy=rd2 |

Box 19 has eight data inputs A, B, C, D, S1, S2, D1, and D2, which correspond to data values a, b, c, d, s1, s2, d1, and d2, respectively, in forward mode, and Σ, ΔV, ΔH, ΔD, rs1, rs2, rd1, and rd2, respectively, in inverse mode.

Box 19 also has two control inputs, PHASE and MODE FORWARD.

FIG. 13 has been shown with some redundancy for conceptual simplicity. Below it will be explained how some of the redundant boxes can be eliminated.

Boxes 1301, 1302, 1303, and 1304 are bit routers. These boxes are only used in inverse operation. In inverse mode, when PHASE=1, boxes 1301 and 1303 receive the input coefficients from the registers 201, and produce the outputs 2*Σ+lsb[ΔV] and 2*ΔH+lsb[ΔD], respectively. In inverse operation, at PHASE=0, boxes 1302 and 1304 receive the partial results rs1, rs2, rd1, and rd2, from the feedback lines 212, and produce the outputs 2*rs1+lsb[rs2] and 2*rd1+lsb[rd2], respectively.

FIG. 13. also has an array of multiplexers, marked MUX which produce the outputs AX, AY, BX, BY, CX, CY, DX, and DY. In forward mode, the multiplexers 1305-1312 choose data from the multiplexers 1313-1320. In inverse mode, the multiplexers 1305-1312 choose data from the multiplexers 1321-1328. When PHASE is high, multiplexers 1313-1328 choose data from their upper input. When PHASE is low, multiplexers 1313-1328 choose data from their lower input.

Outputs AX and BX are actually the same. Therefore boxes 1307, 1315, and 1323 can be eliminated, so that BX just comes from AX. Similarly CX and DX are the same, so that boxes 1311, 1319, and 1327 can be eliminated.

In an alternate embodiment, the tri-state buffers 207 can also be multiplexers to alternately short the pairs of lines S/V and H/D, so that S and V can share a single output pin and H and D share an output pin. If S and V share a physical bus, the width of the physical bus must be the size of the greater of the two. When the size of the data is smaller than the physical bus, the non-significant bit must be set to a known value, such as zero.

As will be clear to those of ordinary skill in the art, the concepts of the present invention can be used to build circuits for calculating other data transformations which require two stages of calculation. For instance, the discrete cosine transformation can be done in much the same way.

The design presented in the preferred embodiment is based on 13 bit pixels, but can be extended to larger pixel representations if more pins are provided and the adder/subtracters and registers are changed accordingly.

Figure 14:
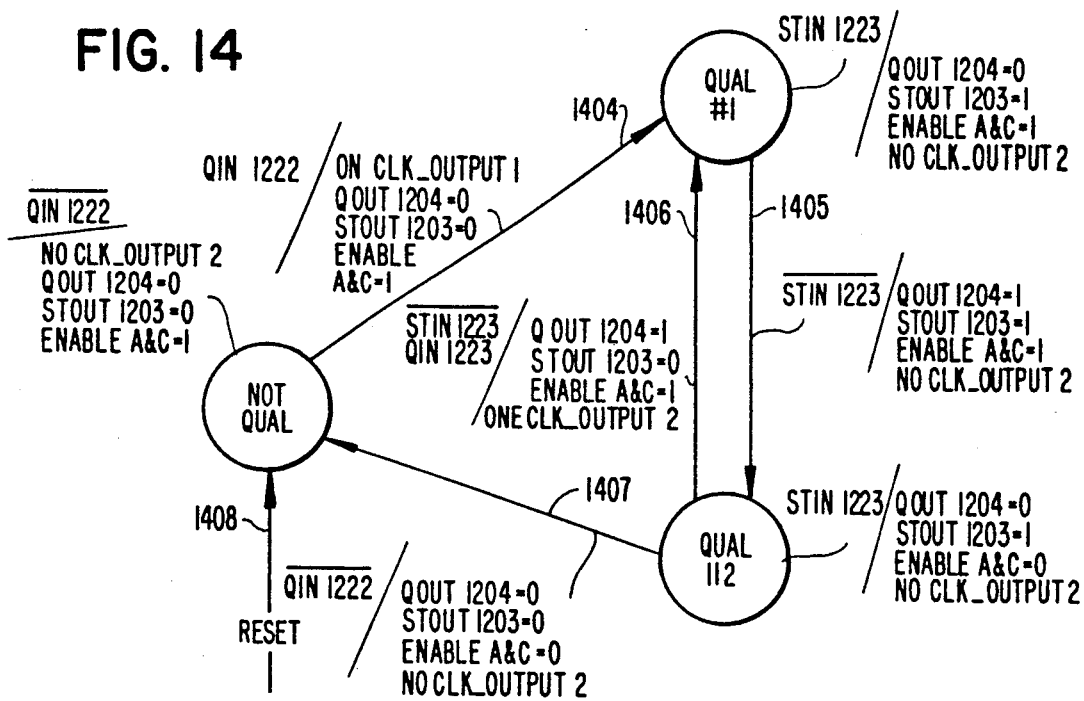
FIG. 14 is a state diagram for the state machine 801.
Figure 16:
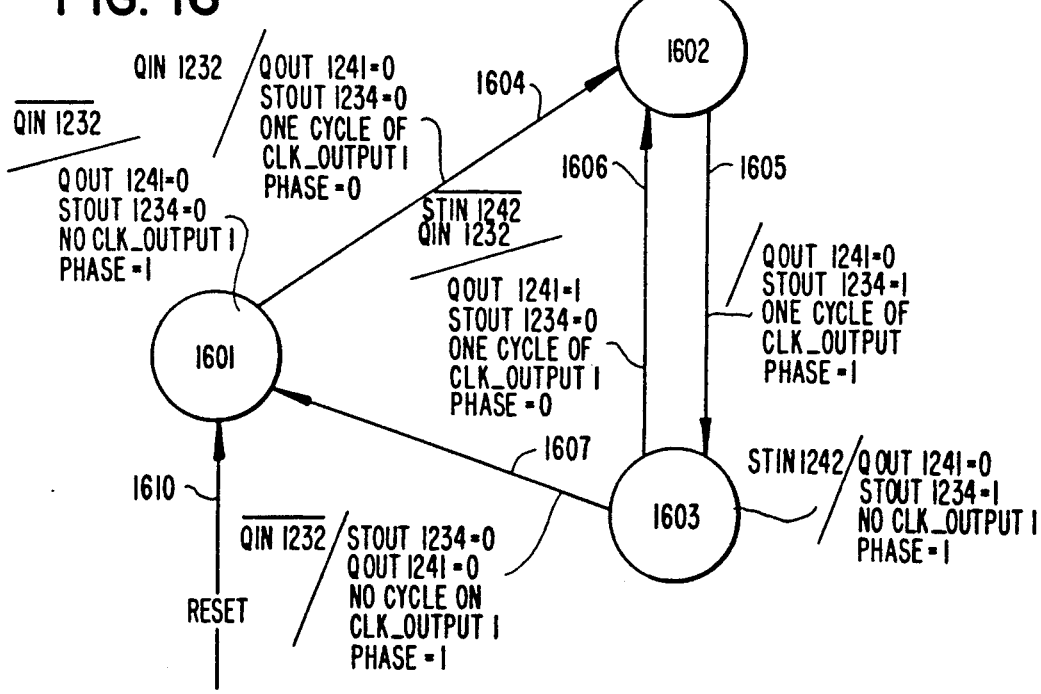
FIG. 16 is a state diagram for the state machine 520 in both inverse and forward modes.

FIGS. 14 through 16 are state diagrams for the PCB blocks 801, 510, and 520, respectively. These state diagrams explain the function of the PCB blocks with reference to their inputs and outputs. The blocks each have respective STOUT, STIN, QOUT, and QIN leads. In order to distinguish these from the STOUT, STIN, QOUT, and QIN leads for the entire control element 702, reference numerals corresponding to lines will be used. Thus, the QOUT for PCB (IN) 510 will be called QOUT 1232, while the QIN for PCB (ALU) 320 will be called QIN 1232. Both points are connected by the same line, and therefore are referred to by the same reference numeral.

FIG. 14 is a state diagram for the PCB block 801 in inverse operation. During state "not qual", box 20 waits for all four reconstructed pixels. The machine waits in state "not qual" while QIN 1222 is low. During state "not qual", there is no cycle on CLK_OUTPUT2, STOUT is zero, and ENABLE A&C is one.

When all of the pixels are ready, the state machine takes transition 1404 to state "qual #1". Transition 1404 is triggered by QIN 1222 going high. During transition 1404, there is a cycle on CLK_OUTPUT2, QOUT is zero, STOUT 1203 is zero, and ENABLE A&C is one. In this case, as in the case of all of the clock signals CLK_INPUT, CLK_OUTPUT1, and CLK_OUTPUT2, the clock cycle is created by using a mask function to allow one cycle of the system clock CLK to pass through to the output line.

The "qual #1" state sends out pixels a and c, if the downstream circuits are ready. The machine stays in state "qual #1" while STIN 1223 is high, meaning that downstream circuits are not ready for more pixels. During state "qual #1", QOUT 1204 is zero, STOUT 1203 is one, there is no cycle on CLK_OUTPUT2, and ENABLE A&C is one.

Once downstream circuits are ready to receive more pixels, the state machine makes transition 1405 to state "qual #2". STIN 1223 going low triggers transition 1405. During transition 1405, QOUT 1204 is one, ENABLE A&C is one, there is no clock cycle on CLK_OUTPUT2, and STOUT 1203 is one.

In state "qual #2", the state machine causes the data path to send out reconstructed pixels b and d. The machine stays in state "qual#2" while STIN 1223 is high, in other words, while the downstream circuit cannot take more pixels. During state "qual #2", QOUT 1204 is zero, ENABLE A&C is zero, there is no clock cycle on CLK_OUTPUT2, and STOUT 1203 is one.

When new data is ready, the state machine makes transition 1406 to state "qual #1". Transition 1406 is triggered by STIN 1223 going low while QIN 1222 is high. During transition 1406, QOUT 1204 is one, STOUT 1203 is zero, ENABLE A&C is one, and there is a clock cycle on CLK_OUTPUT2.

If there is no more data ready, the state machine makes transition 1407 to state "not qual". Transition 1407 is triggered by QIN 1222 going low. During transition 1407, QOUT 1204 is zero, there is no cycle on CLK_OUTPUT2, ENABLE A&C is zero, and STOUT1 is zero.

Box 801 has a reset input 1408, for initializing the machine to state "not qual".

In forward mode, state machine 801 is always in the state "not qual".

Figure 15A:
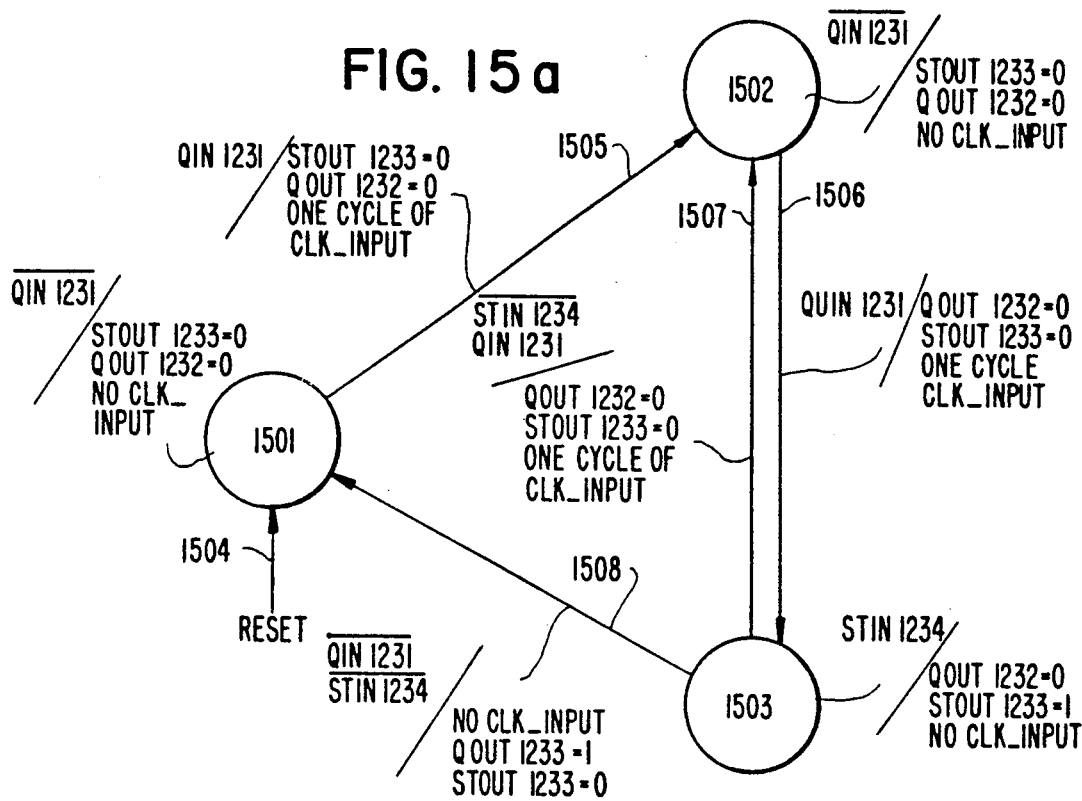
FIG. 15a is a state diagram for the state machine 510 during forward mode.

FIG. 15a is a state diagram for PCB block 510 in forward mode.

The machine starts with state 1501. The machine waits in this state while QIN 1231 remains low, indicating that the machine is waiting for the a and c pixels, . During state 1501, STOUT 1233 is zero, QOUT 1232 is zero, and there is no clock cycle on the line CLK_INPUT. Block 510 can be reset to state 1501 in forward mode, with the reset input 1504.

When both the a and c pixels are ready, the machine takes transition 1505 to state 1502. Transition 1505 is triggered by QIN 1231 going high. During transition 1505, STOUT 1233 is zero, QOUT 1232 is zero, and one cycle of CLK_INPUT occurs .

In state 1502, the machine waits for the b and d pixels, indicated by QIN 1231 remaining low. During state 1502, STOUT 1233 is zero, QOUT 1232 is zero, and there is no cycle on CLK_INPUT.

When both the b and d pixels are ready, the machine takes transition 1506 to state 1503. QIN 1231 going high triggers transition 1506. During transition 1506, there is one cycle of CLK_INPUT, QOUT 1232 is zero, and STOUT 1233 is zero.

The machine stays in state 1503 if there are more pixels, but the downstream circuitry cannot take more data, indicated by STIN 1234 staying high. During state 1503, QOUT 1232 is one, STOUT 1233 is one, and there is no cycle on CLK_INPUT.

When a and c pixels are again ready, the machine will take transition 1507 to state 1502. Transition 1507 is triggered by QIN 1231 being high while STIN 1234 is low. During transition 1507, QOUT 1232 is zero, STOUT 1233 is zero, and there is one cycle of CLK_INPUT.

If there are no more pixels, the machine takes transition 1508 to state 1501. Transition 1508 is triggered by QIN 1231 and STIN 1234 being low. During transition 1508, QOUT 1232 is one, STOUT 1233 is zero, and there is no cycle on CLK_INPUT.

Figure 15B:
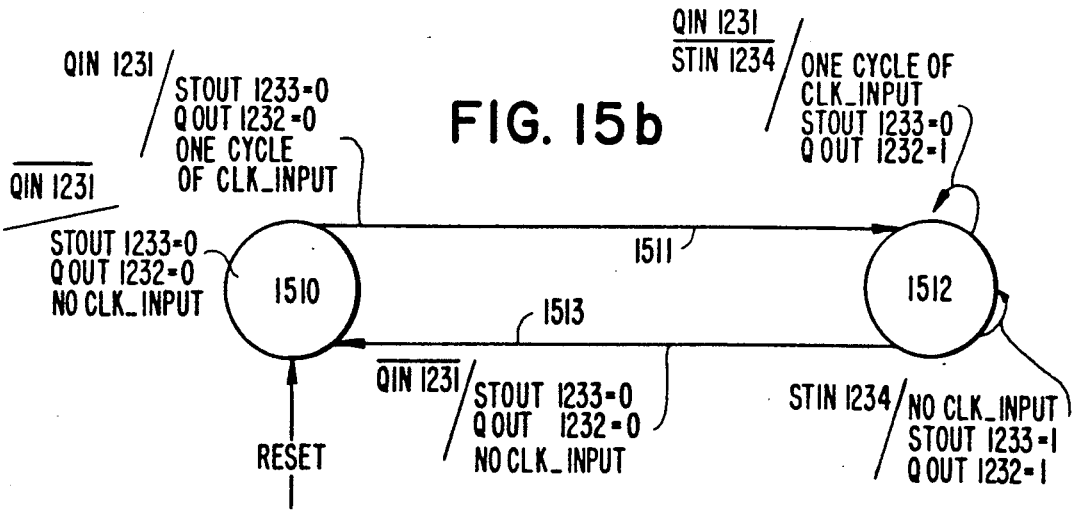
FIG. 15b is a state diagram for the state machine 510 in inverse mode.

FIG. 15b is a state diagram for PCB block 510 in inverse mode. The state machine starts at state 1510. During state 1510, the machine waits for coefficients, indicated by QIN 1231 remaining low. During state 1510, STOUT 1233 is zero, QOUT 1232 is zero, and there is no clock cycle on CLK_INPUT.

When the coefficients are ready the state machine makes transition 1511 to state 1512. Transition 1511 is triggered by QIN 1231 going high. During transition 1511, STOUT 1233 is zero, QOUT 1232 is zero, and CLK_INPUT cycles once.

The machine stays in state 1512 if coefficients are ready or if downstream circuits cannot take coefficients. The former case is indicated by QIN 1231 being high and STIN 1234 being low, which results in there being one cycle of CLK_INPUT, STOUT 1233 being zero, and QOUT 1232 being one. The latter case is indicated by STIN 1234 being high, which results in there being no cycle on $CLK_{13}$ INPUT, STOUT 1233 being one and QOUT 1232 being one.

If no more coefficients are ready, the machine takes transition 1513 to state 1510. Transition 1513 is triggered by QIN 1231 going low. During transition 1513, STOUT 1233 is zero, QOUT 1232 is zero, and there is no cycle on $CLK_{13}$ INPUT.

FIG. 16 is a state diagram for PCB block 520 in all modes. The machine starts out in 1601. A reset input 1610 can set the machine back to state 1601 at any time. The machine waits at state 1601 for all four pixels or coefficients to be ready, which is indicated by QIN 1232 remaining low. During state 1601, QOUT 1241 is zero, STOUT 1234 is zero, PHASE is one, and there is no cycle on CLK_OUTPUT1.

When all data is ready, the machine takes transition 1604 to state 1602. Transition 1604 is triggered by QIN 1232 going high. During transition 1604, QOUT 1241 is zero, STOUT 1234 is zero, PHASE is zero, and CLK_OUTPUT2 goes through one cycle.

At state 1602, the partial result of the two-phase butterfly calculation is computed. Then the machine makes the unconditional transition 1605. During transition 1605, QOUT 1241 is zero, STOUT 1234 is one, PHASE is one, and there is one cycle of CLK_OUTPUT1.

During state 1603, the final result of the two phase butterfly calculation is completed. The machine remains in state 1603 while STIN 1242 is high, indicating that the downstream circuitry is not ready for further results. QOUT 1241 is zero, there is no signal on CLK_OUTPUT2, PHASE is one, and and STOUT 1234 is one.

When more input data is ready, the machine makes transition 1606 to state 1602. Transition 1606 is triggered by STIN 1242 going low while QIN 1232 is high. During transition 1606, QOUT 1241 is one, STOUT 1234 is zero, PHASE is zero, and there is one cycle of CLK_OUTPUT1.

If there is no more input data, the machine takes transition 1607 to state 1601. Transition 1607 is triggered by QIN 1232 going low. During transition 1607, STOUT 1234 is zero, QOUT 1241 is zero, there is no cycle on CLK_OUTPUT 1 and PHASE is one.

While the above description has been formulated for the S transform, it will be clear to those of ordinary skill in the art that the architecture is equally applicable to any butterfly operation using input pixels in the same configuration, i.e. when the input pixels are taken from 2×2 input squares.

I claim:

1. Apparatus for calculating a data transformation which includes at least two successive arithmetic operations, the apparatus comprising:
   (a) a first set of terminals for receiving a plurality of input data signals in parallel;
   (b) a single stage comprising a plurality of means, disposed in parallel, for performing arithmetic operations;
   (c) means for feeding results of a first set of arithmetic operations back to said single stage so that said single stage subsequently performs a second set of arithmetic operations on said results; and
   (d) a second set of terminals for supplying a plurality of transformed data signals wherein
   (e) the data transformation is the S-transform;
   (f) the first set of terminals is for receiving signals representing four data points arranged in a 2×2 array;

(g) each means for performing comprises a respective adder/subtracter; and
(h) the second set of terminals is for supplying signals representing four coefficients of the S-transform.

2. The apparatus of claim 1, further comprising
(a) switching means for
  (i) in a forward mode, routing signals from the first set of parallel terminals through the single stage so that a result of the data transformation appears at the second set of parallel terminals; and
  (ii) in an inverse mode, routing signals from the second set of parallel terminals through the single stage so that a result of an inverse of the data transformation appears at the first set of parallel terminals; and, wherein
(b) in said inverse mode, said first set of terminals supplies signals representing pixels; and
(c) in said inverse mode said second set of terminals receives signals representing coefficients of the S-transform.

3. Apparatus for calculating a data transformation which includes at least two successive arithmetic operations, the apparatus comprising:
(a) a first set of terminals for receiving a plurality of input data signals in parallel;
(b) a single stage comprising a plurality of means, disposed in parallel, for performing arithmetic operations;
(c) means for feeding results of a first set of arithmetic operations back to said single stage so that said single stage subsequently performs a second set of arithmetic operations on said results; and
(d) a second set of terminals for supplying a plurality of transformed data signals wherein
(e) the data transformation is the inverse S-transform;
(f) the first set of terminals comprises exactly four terminals for receiving four input coefficients; and
(c) the second set of terminals comprises exactly four terminals for providing four output pixels.

4. The apparatus of claim 3, wherein
(a) each means for performing comprises a respective adder/subtractor; and
(b) the feeding means comprises a plurality of registers arranged in parallel for storing said results; and
(c) the apparatus further comprises means for synchronizing control so that new data is provided to the single stage after the single stage has finished processing current data.

5. Apparatus for calculating a data transformation which includes at least two successive arithmetic operations, the apparatus comprising:
(a) a first set of parallel terminals;
(b) a single stage comprising a plurality of means, disposed in parallel, for performing arithmetic operations;
(c) means for feeding results of a first set of arithmetic operations back to said single stage so that said single stage subsequently performs a second set of arithmetic operations on said results;
(d) a second set of parallel terminals; and
(e) switching means for:
  (i) in a forward mode, routing signals from the first set of parallel terminals through the single stage so that a result of the data transformation appears at the second set of parallel terminals; and
  (ii) in an inverse mode, routing signals from the second set of parallel terminals through the single stage so that a result of an inverse of the data transformation appears at the first set of parallel terminals.

6. The apparatus of claim 5, wherein the data transformation is the S-transform.

7. The apparatus of claim 6, wherein
(a) the first set of terminals comprises exactly four terminals for receiving four input pixels in the forward mode and for supplying four output pixels in the inverse mode; and
(b) the second set of terminals comprises exactly four terminals for providing four output coefficients in the forward mode and for receiving four input coefficients in the inverse mode.

8. The apparatus of claim 7, wherein
(a) each means for performing comprises a respective adder/subtracter; and
(b) the feeding means comprises a plurality of registers arranged in parallel for storing said results; and
(c) the apparatus further comprises means for synchronizing control so that new data is provided to the single stage after the single stage has completed processing current data.

9. The apparatus of claim 5, wherein signals appearing at the first set of parallel terminals represent pixels and the switching means comprises a clamp circuit for regulating pixel intensities in the inverse mode.

10. The apparatus of claim 9, further comprising means for synchronizing control so that new data is provided to the single stage after the single stage has finished processing current data.

* * * * *